July 13, 1965 R. J. TREADWELL 3,194,895

APPARATUS FOR SOUND REPRODUCTION

Filed June 22, 1962 3 Sheets-Sheet 1

INVENTOR

RICHARD JULIAN TREADWELL

BY Moreland Hall

ATTORNEYS

July 13, 1965 R. J. TREADWELL 3,194,895

APPARATUS FOR SOUND REPRODUCTION

Filed June 22, 1962 3 Sheets-Sheet 2

INVENTOR
RICHARD JULIAN TREADWELL
BY Moore and Hall
ATTORNEYS

INVENTOR
RICHARD JULIAN TREADWELL
BY Moore and Hall
ATTORNEYS 3,194,895

APPARATUS FOR SOUND REPRODUCTION

Richard Julian Treadwell, Cheltenham, England, assignor to S. Smith & Sons (England) Limited, Cricklewood, London, England, a British company Filed June 22, 1962, Ser. No. 204,475
Claims priority, application Great Britain, June 23, 1961, 22,751/61; Sept. 8, 1961, 32,269/61
15 Claims. (Cl. 179—100.2)

Figure 1:
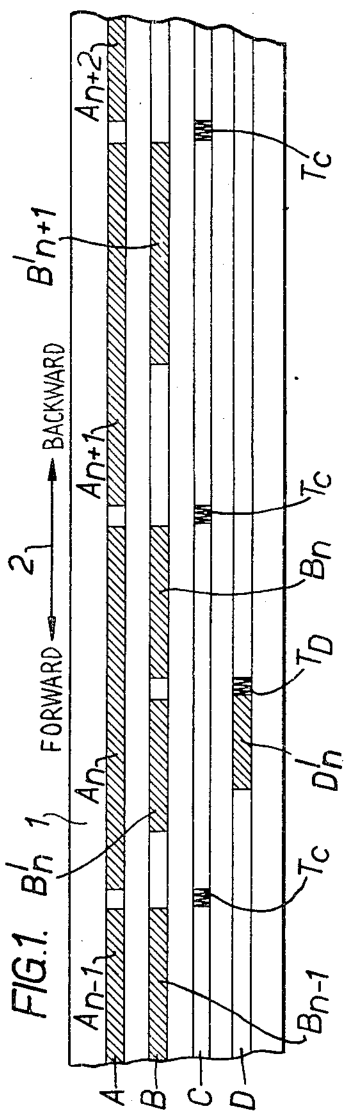

The present invention relates to apparatus for sound reproduction, and is concerned in particular with apparatus comprising, in combination, a recorded sound reproducing device and a record carrier or carriers on which are recorded a series of records arranged in a particular manner, the device including a control apparatus such that operation of the controls of the device results in the reproduction of some or all of the records in a sequence which is determined in part by the manner in which the controls are operated.

A particular application of the apparatus is as an aid to personnel concerned with the maintainance of complex equipment, although there are other applications as will be mentioned below. With the increasing complexity of present day equipment of all kinds, and particularly electronic and electro-mechanical equipment such as computers, data-processing equipment and automatic control systems, the question of maintenance, whether of a routine nature or in an endeavour to rectify a specific fault, is one of increasing difficulty, demanding the services of highly skilled maintenance engineers.

It has been proposed, and in some instances test equipment has been provided, which is capable of automatically carrying out a test routine on a specific equipment, test equipment of this nature being sometimes known as automatic check-out equipment. However, automatic check-out equipment itself is of necessity complex and expensive and may require the provision of many extra test points and connections and other facilities in the equipment which it is to test.

Where a test routine is left to maintenance personnel, it becomes a virtual necessity to provide guidance as to the manner in which a thorough check should be carried out. In the past, this has been provided by maintenance routines printed in handbooks or other publications, but this has disadvantages where the routine is of any length, particularly where the equipment is distributed about some structure, for example an aircraft or different compartments of a warship, and the maintenance personnel have to move from one part to another. Intermittent references to a printed routine may lead to the inadvertent omission of one or more steps, and there is no assurance that a maintenance engineer may not omit one or more tests, or perform them in the wrong order, in a misguided endeavour to locate a fault quickly.

It is now proposed to meet these difficulties by providing apparatus comprising in combination a record reproducing device, such as a tape player, and a record carrier, such as a magnetic tape, carrying records of maintenance instructions arranged in a particular order which, together with the arrangement of the controls on the reproducing device, will enable an operator to obtain reproduction of the instructions in an order which, whilst it will naturally vary depending on the result of the tests, is otherwise predetermined.

According to the present invention, there is provided apparatus comprising in combination a recorded sound reproducing device and a record carrier (or a series of record carriers) providing at least two parallel channels. One of said channels carries a series of primary records distributed along its length in a given order and direction, and a further channel or channels carries or carry a plurality of secondary records of which there is at least one associated with each of a plurality of the records. The reproducing device is provided with means for selectively reproducing records from any one of the channels, and with control means including manually operable actuating means having first and second actuated conditions. The device includes a first control arrangement responsive to the first actuated condition of the actuating means when the device is stopped at the commencement of a primary record, and operating to initiate reproduction of that primary record, means being provided for automatically stopping the device at the end of the reproduction of any primary record. The device also includes a second control arrangement responsive to the second actuated condition of the actuating means when the device is stopped at the end of a primary record, operating to initiate reproduction of a secondary record, if any, associated with that primary record; and means are also provided for automatically resetting the device ready for reproduction from a predetermined point in the first channel after reproduction of the, or some of the, secondary records associated with a primary record.

The predetermined point in the first channel is preferably the beginning of the primary record with which the secondary records are associated. It could in another case be the beginning of the next primary record.

Usually, at least some of the primary records will each have a series of secondary records associated with them, each series including at least one secondary record of a first kind and at least two secondary records of a second kind, and there being one more of the second kind than of the first kind. In such a case, the second control arrangement will be arranged to respond as aforesaid to initiate reproduction of a predetermined one of the secondary records of the first kind included in the series, and there will further be provided a third control arrangement responsive to the first actuated condition of the actuating means when the device is stopped at the end of a secondary record of the first kind to initiate reproduction of a predetermined secondary record of the second kind, and a fourth control arrangement responsive to the second actuated condition of the actuating means when the device is stopped at the end of a secondary record of the first kind to initiate reproduction of a further predetermined secondary record, whilst said automatic resetting means will be arranged automatically to reset the device after reproduction of a secondary record of the second kind.

In each said series, it may be arranged that each predetermined secondary record of the second kind reproduction of which is to be initiated by the third control arrangement, is recorded in the same channel as the secondary record of the first kind at the end of which the device must be stopped for reproduction to be initiated.

In the simplest case, a series will include one secondary record of the first kind and two secondary records of the second kind.

Where there is not a series of secondary records associated with a primary record, there may be either a single secondary record of the second kind or no secondary record at all.

Where there are one or more series of secondary records which include a plurality of secondary records of the first kind, the further channels of the record carrier are preferably employed in the same manner in the arrangement of each series. Thus, for example, the number of further channels provided may be one greater than the maximum number constituting said plurality, the secondary records of the first kind in a given series each being recorded in a different further channel, the further channels being utilised in the same order in every one of the said series, each secondary record of the first kind being followed in the same channel by a secondary record of the second kind and, in each series, a further secondary record of the second kind being recorded in that one of the further channels which is next in order after the last one to contain a secondary record of the first kind.

In a convenient arrangement, any secondary record, reproduction of which is to be initiated by the second control arrangement, will be recorded so that it commences at a point in the further channel in which it is recorded, parallel to the end of the primary record with which the secondary record is associated. Further, any secondary records, reproduction of which is to be initiated by the third and fourth control arrangements, may conveniently commence at a point in the channels in which they are recorded, parallel to that end of the secondary record of the first kind at which the device must be stopped for reproduction of them to be initiated. One may be in the same channel as the secondary record of the first kind and the other in another channel.

The secondary records are preferably all recorded in the same direction in the further channels. If the predetermined point in the first channel, to which the device is reset, is the beginning of the primary record with which the secondary records are associated, the secondary records are preferably recorded in the opposite direction to the primary records but the same direction may be employed.

The record carrier or series of carriers may provide, in addition, at least one control channel in which only control signal records are recorded, the reproducing device further including means for reproducing control signals from any such control channel, and the control means including control signal responsive means coupled to said control signal reproducing means.

Control signals may also be recorded, if required, in one or more of the first and further channels.

Considering the application of apparatus according to the present invention as a maintenance aid, the intention is that verbal instructions for carrying out a systematic routine shall be recorded (the recordings of the instructions constitute in this case the primary and secondary records referred to above) on a number of channels on, for example, a magnetic tape. The arrangement of the records on the tape and of the controls on the reproducing device is such that a mainaenance engineer, by operation of a simple manually operable actuating means having two actuated conditions (these will be referred to as "yes" and "no" in this specification), for example two push buttons one operated for "yes" and the other for "no" or any other convenient electric switch actuating mechanism such as a toggle, will cause the reproduction of the maintenance instructions by the device in a predetermined order. At the end of each instruction the device stops and the next appropriate instruction is reproduced on operating the "yes" or the "no" button (assuming the control to take this form) according to the result of the test or operation carried out according to the previous instruction. If the apparatus under test is operating correctly, the resultant operation of the "yes" button at the end of each test will result in the reproduction of a primary series of instructions. If a fault is present, the answer to one of the primary instructions will be "no," and a further subsidiary test or series of tests may then be required to locate the fault precisely. Records for reproducing the necessary instructions (these may in some cases have to include instructions to refer to detailed written or printed instructions) are provided, and the requisite ones are reproduced in sequence on appropriate operation of the control after first pressing the "no" button. When the fault has been located and corrected, the apparatus will have been automatically reset to a predetermined point in the first channel. This point is preferably that required to reproduce again the instruction which first gave rise to the answer "no," the apparatus then being tested by following the instruction for a second time to ensure that the fault has been removed.

In this manner, maintenance engineers can be saved the often tedious and inefficient procedure of referring to a printed maintenance routine. In addition, it is possible to ensure that the tests are carried out in a predetermined methodical order so that faults may be diagnosed correctly and rapidly.

Whilst this is the prime purpose of the apparatus, it is considered that other applications are possible. For example, the apparatus may be utilized to provide a series of instructions for carrying out a chemical analysis, or to carry out a manufacturing, assembly or testing procedure.

At any point, a primary record may be inserted in the series which is simply an instruction to make some preparation for a test covered by a following instruction. Such a primary record will have no secondary records associated with it and will always be succeeded by the answer "yes" and reproduction of the next primary record. Similar records may also be included among the secondary records of a series associated with a given primary record.

Figure 2A:
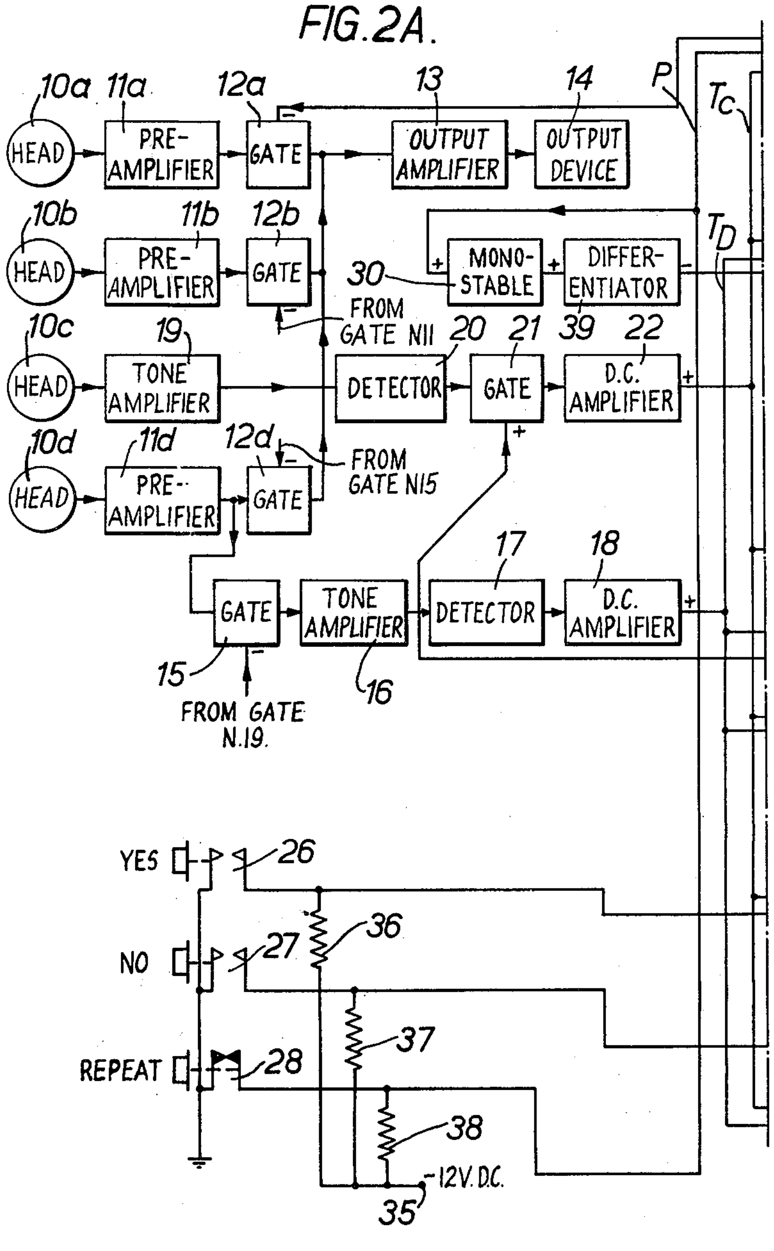
Figure 2B:
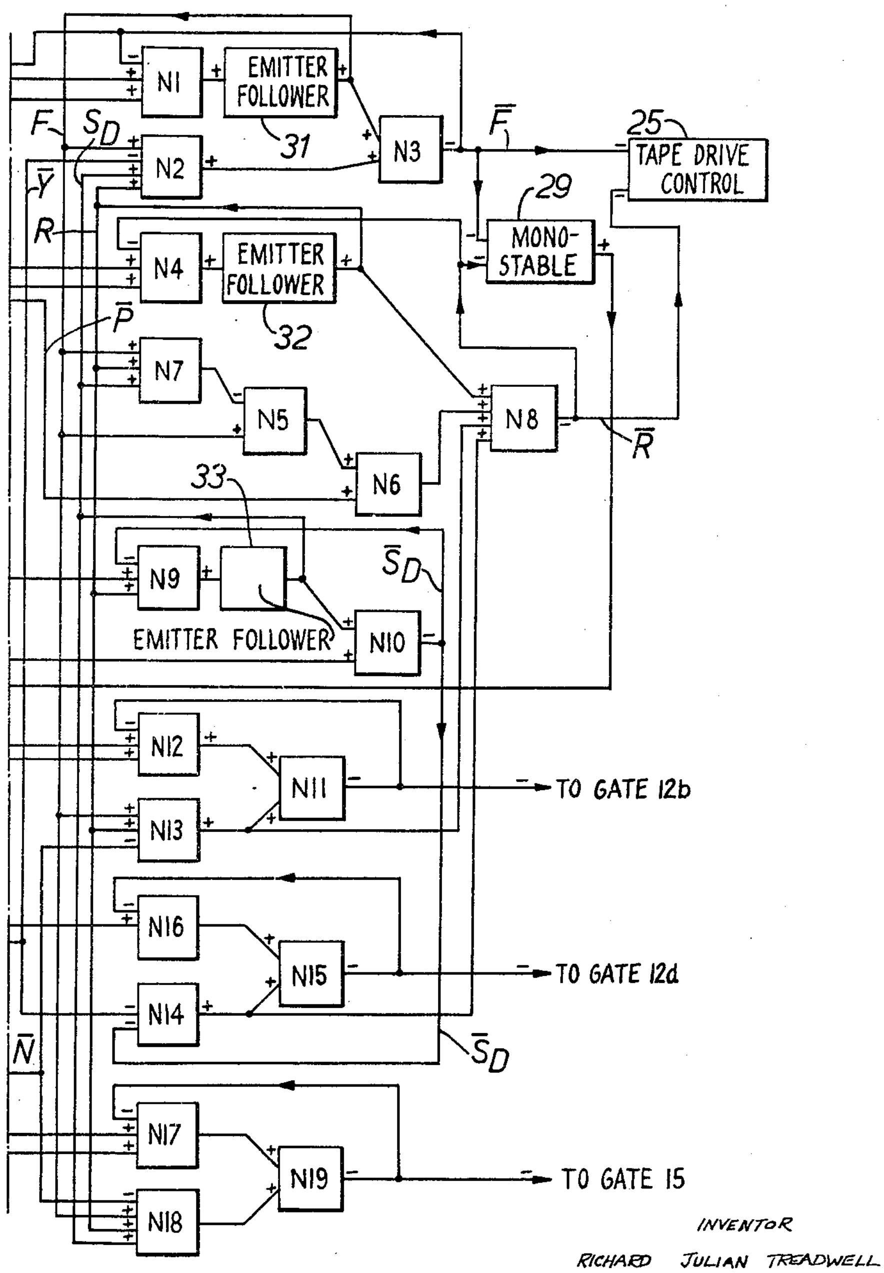

An apparatus according to the present invention will now be described by way of example with reference to the accompanying drawings in which:

FIGURE 1 is a diagram illustrating the manner in which records are arranged on a four channel magnetic tape employed in the apparatus, and FIGURES 2A and 2B show a block circuit diagram of the reproducing device.

Referring first to FIGURE 1, there is shown a representation of part of the length of a conventional magnetic recording tape 1 having four parallel channels A–D lying parallel to its length, in which channels various records are arranged. In operation, the tape 1 can be moved in either direction parallel to its length, as indicated by the arrows 2. To this end, the reproducing device includes conventional tape storage spools, and a reversible tape drive. It also includes four "playback" heads, positioned across the width of the tape 1, when it is mounted in the device ready for operation, so that each can produce an electric signal output representing the records recorded in a respective one of the four channels A–D. Each of the channels A–D is indicated in FIGURE 1 purely diagrammatically by means of a double line.

Channel A has recorded in it, in order, a series of primary records $A_1 \ldots A_p$ where $p$ is a positive integer and may, for example, be 100. FIGURE 1 shows shaded areas $A_n$ and $A_{(n+1)}$ representing the parts of channel A occupied by the $n$th and $(n+1)$th of these primary records, and further areas $A_{(n-1)}$ and $A_{(n+2)}$ representing parts of the preceding and succeeding records. (It should be noted that the lengths and spacings of the records as shown are not to scale.) The records $A_1 \ldots A_p$ are recorded so as to be correctly reproduced by movement of the tape 1 to the left in FIGURE 1 relative to the heads which are fixed. This will be referred to as forward movement.

Channel B has recorded in it various secondary records $B_1 \ldots B_p$ corresponding in order to the primary records $A_1 \ldots A_p$ of the same suffix. However, some of the records $B_1 \ldots B_p$ may be omitted altogether, i.e. there may be some records $A_1 \ldots A_p$ which have no secondary record of either kind associated with them. Record $B_1$ commences parallel to the end of record $A_1$, but is recorded in the opposite direction so as to be correctly reproduced by movement of the tape 1 to the right in FIGURE 1 relative to the heads (this will be referred to as backwards movement). The other records $B_2 \ldots B_p$ are similarly arranged relative to the corresponding primary records. Records $B_n$ and $B_{(n+1)}$ are shown in FIGURE 1 together with part of record $B_{(n-1)}$. The records $B_1 \ldots B_p$ may be of either a first or a second kind, those of the second kind being indicated in FIGURE 1; and from now onwards in this description such records will be designated by a dash super-script, for example $B_{(n+1)}{}^1$ or $D_n{}^1$.

Channel C is a control channel and has recorded in it control records $T_c$ which, when reproduced, simply give rise to a burst of tone signal (i.e. a burst of oscillation of predetermined audio frequency). Each burst occurs parallel to the beginnings and endings of the primary records $A_1 \ldots A_p$, there being a small space between the ends of adjacent primary records. Channel C is thus only a control channel, since it contains control signals and no primary or secondary records.

Channel D has a secondary record of the second kind recorded in it wherever there is a secondary record of the first kind recorded in channel B, this record commencing at a point in channel D parallel to the end of the record in channel B and being recorded in the same direction as the record in channel B. Thus, in FIGURE 1, there is shown one secondary record of the first kind, record $B_n$, and channel D accordingly carries a secondary record of the second kind $D_n{}^1$. In addition, channel B carries after each secondary record of the first kind a further secondary record of the second kind. This is shown in the case of record $B_n$ as record $B_n{}^1$. Channel D also carries some control records $T_d$ which are tone signal records similar to the records $T_c$, and are positioned parallel to the ends of any secondary record of the first kind in channel B, i.e. at the commencement of each secondary record in channel D.

In every case, in either channel B or D, the secondary records corresponding to a given primary record must not occupy a greater length of the tape 1 than that primary record.

The apparatus being described is intended for use in assisting a maintenance engineer in carrying out a systematic fault finding routine on a certain item of electromechanical equipment such as an automatic flight control and instrument system for an aircraft. For this purpose, each primary record $A_1 \ldots A_p$, when reproduced, gives an instruction to effect a certain test on the equipment such as determining whether there is a given signal or voltage at a given point in the equipment. The tape player has two basic controls, a "yes" button and a "no" button. When set up with a tape loaded in it with the beginning of record $A_1$ to the right (as shown in FIGURE 1) of the reproducing heads, operation of the "yes" button sets the tape in motion (the details of the control circuits for effecting this and the other operation to be described are given below with reference to FIGURE 2) in the forward direction until the first control record $T_c$, located parallel to the beginning of record $A_1$, is reproduced, at which time the tape is stopped. Further operation of the "yes" button now brings about reproduction of record $A_1$, with the machine again being stopped upon reproduction of the second control record $T_c$.

The maintenance engineer now carries out the test given to him by the reproduction of record $A_1$, and depending on the result, successful or unsuccessful, presses the "yes" button or the "no" button. Assuming the "yes" button is pushed, record $A_2$ is reproduced and the tape is again stopped by the appropriate record $T_c$ at the end of it. In this manner, assuming the "yes" button is operated after each primary test, the primary records $A_1 \ldots A_p$ will be reproduced in order. This will evidently occur if there is no fault in the equipment or part of the equipment for which the tape is intended to provide maintenance instructions.

If, at any stage, a test is unsuccessful, the engineer presses the "no" button. Let us assume this occurs after primary record $A_n$. Operation of the "no" button will then bring about reproduction of secondary record $B_n$, the machine moving the tape backwards for this purpose and being stopped by the reproduction of the control record $T_d$ located parallel to the end of record $B_n$. If the secondary test covered by record $B_n$ is successful, the engineer presses the "yes" button and the secondary record $D_n{}^1$ is then reproduced from channel D, the machine running on at the end until it is stopped by the record $T_c$ at a position parallel to the beginning of record $A_n$. If the secondary test covered by record $B_n$ is unsuccessful, the engineer presses the "no" button and the secondary record $B_n{}^1$ is then reproduced from channel B, the machine again running on until stopped by the record $T_c$ parallel to the beginning of record A.

It will be remembered that record $B_n$ is a secondary record of the first kind. This is simply the kind of record giving a test instruction which, in its turn, leads to one of two answers, thus requiring the reproduction of secondary records of the second kind $B_n{}^1$ and $D_n{}^1$ in channels B and D respectively, and a control record $T_d$ in channel D. Secondary records of the second kind give instructions having only one response, i.e., instructions such as "replace this unit" or "replace that item" or "repair such-and-such a connection." Alternatively they may be an instruction to refer to a particular one of a referenced set of detailed fault finding cards supplied for particular units of the equipment, the unit having been identified by the response to the recorded tests but being too complex for a complete fault finding routine to be recorded.

Finally, when the test (given by whichever of records $B_n{}^1$ and $D_n{}^1$ has been reproduced) has been successfully completed, the engineer presses the "yes" button again. The tape is moved forwards again reproducing record $A_n$, thereby instructing a repeat of the test ordered by record $A_n$; and this repeat should then result in the "yes" button being pressed, if the fault has been eliminated. This will in turn result in reproduction of record $A_{(n+1)}$, thereby causing the test procedure to continue in an orderly fashion.

Where a single secondary record of the second kind suffices to deal with the situation after the "no" button has been pressed at the end of a given primary record, this single secondary record is recorded in the backwards direction in channel B, and is automatically reproduced upon pressing of the "no" button. At the end, the tape runs on until stopped by the record $T_c$ located parallel to the beginning of the primary record concerned. Subsequent operation is then as before. This is shown in FIGURE 1, where a single secondary record of the second kind $B_{(n+1)}{}^1$ is provided in channel B for reproduction if the "no" button is pressed after completion of the test covered by record $A_{(n+1)}$.

Further, some primary records may simply be an instruction, for example a preparatory instruction, which can lead to only one result. No secondary records will be associated with such primary records, and the "yes" button will always be operated after them.

In case of mis-hearing, a "repeat" button is provided which will bring about a further reproduction of any primary record just reproduced (the machine being stopped at the end of it) or in the course of reproduction.

FIGURE 2 of the accompanying drawing shows a block circuit diagram of the reproducing device. The device includes four playback heads 10*a–d*, each of conventional form and positioned conventionally relative to a tape loaded in the device to produce electric signals representing the records provided in the respective channels A–D. The signals generated in heads 10*a* and 10*b* are treated alike, the output of each being fed through a pre-amplifier 11*a* or 11*b* respectively to the input of a gate circuit 12*a* or 12*b*. The signal outputs of the gate circuits 12*a* and 12*b* are connected together to the input of a common output amplifier 13, the output of which is fed to an output device 14 such as a loudspeaker or head-phones. More than one output device, for example one mounted on the reproducing device itself and one on an extension lead, may be provided if required. The gate circuits 12*a* and 12*b* also have gating signal inputs, and are arranged in known manner to respond to suitable gating signals thereby either to block or to pass signals from the signal input to the output. The form and sources of the gating signals will be described below.

Head 10*d* is similarly associated with a signal chain including a pre-amplifier 11*d* and a gate circuit 12*d*, the signal input of which is coupled to the output of the pre-amplifier 11*d* and the signal output of which is coupled in common with the outputs of gating circuits 12*a* and 12*b* to the input of amplifier 13. Additionally, the output of pre-amplifier 11*d* is coupled to the signal input of a second gating circuit 15, the signal output of which is coupled to a signal chain including a tone amplifier 16, a detector 17 and a D.C. amplifier 18 in order. The gating signals to circuits 12*d* and 15 are arranged so that circuit 12*d* is open only when a secondary record is to be reproduced from channel D, whilst gate 15 is open only when it is required to detect the presence of a control record $T_D$ in channel D.

Head 10*c* has only a tone signal chain associated with it, since channel C has only the control records $T_c$ recorded in it. This chain includes a tone amplifier 19, a detector 20, a gating circuit 21 and a D.C. amplifier 22 coupled to one another in the order given. The gating circuit 21 is supplied with gating signals such that it is open except for a short period on each occasion that the tape commences to move after having been stopped by a control record $T_c$. This is to prevent the same record $T_c$ from stopping it again and thus preventing movement.

By suitable control of the gating signals applied to gate circuits 12*a*, 12*b* and 12*d*, a record in any of channels A, B or D can be reproduced through the output device 14. At the same time, the D.C. amplifiers 22 and 18 produce an output signal wherever a control record $T_c$ or $T_D$ is reproduced from channel C or channel D respectively. The outputs of amplifiers 22 and 18 are normally held at a more positive potential, ground potential or slightly below it and fall to a negative potential, say −12 volts D.C., when a tone signal is reproduced. These same signal levels are employed throughout the switching circuits which form the remainder of the reproducing device, the absence of a signal being represented by the more positive potential and the presence of a signal by the other. For convenience, these will be referred to in the following description as negative and positive voltages, although in fact the latter is either ground potential or a small negative voltage.

The remainder of the device consists of a tape drive control circuit 25, three push button operated contacts 26, 27 and 28 which are controlled by the "Yes," "No" and "Repeat" buttons, respectively, two monostable circuits 29 and 30, three transistor emitter-follower circuits 31–33, nineteen NOR-gate circuits N1–N19 and various inter-connections, power supplies and other items. Throughout FIGURE 2, the various interconnections are marked where appropriate with "+" and "−" symbols, these indicating whether the connection has the positive or negative voltage (see the previous paragraph) applied to it when the device is at rest, with none of the pushbuttons being operated and with the tape being located, at a position such that one of the control records $T_c$ lies under the head 10*c*. There will be no signal output from amplifier 22 despite this last condition since the tape is still. In addition, some connections can be identified with a given condition, the presence of the negative signal voltage on a particular connection representing the existence of the condition and, conversely, the presence of the positive signal voltage representing the absence of the condition.

These particular conditions, so designated in FIGURE 2, are:

(i) Whether the "Yes" button is pressed ---------- Y
(ii) Whether the "No" button is pressed ---------- N
(iii) Whether the "Repeat" button is pressed ----- P
(iv) Whether the tape is being driven forwards --- F
(v) Whether the tape is being driven backwards --- R
(vi) Whether a control signal $T_c$ has been reproduced ---------- $T_c$
(vii) Whether a control signal $T_D$ has been reproduced ---------- $T_D$
(viii) And whether, if the tape is not moving, it is at rest as a result of reproduction of a control signal $T_D$ ---------- $S_D$ Connections in FIGURE 2 which carry signals in accordance with these conditions are marked with the appropriate letter, and those which carry signals in accordance wtih the opposite condition are marked $\overline{Y}$, $\overline{N}$ . . . $\overline{S}_D$, using the usual Boolean notation.

A signal representing condition $\overline{Y}$ appears on the line interconnecting contact 26 and inputs of gate N2 and N14. Normally this line is at the negative potential by virtue of its connection, through resistor 36, to terminal 35 which is maintained at −12 volts D.C. Operation of the "Yes" button closes contact 26 connecting the line to ground. Similarly signals representing the conditions $\overline{N}$ and P appear on the lines respectively connecting contact 27 to gates N13 and N18 and connecting contact 28 to gate N1 and monostable circuit 30. It should be noted that contact 28 is normally closed so that the line from it is normally at ground potential and drops to −12 volts when the "Repeat" button is operated. Resistors 37 and 38 are associated with contacts 27 and 28 respectively.

A signal representing condition $T_c$ appears, as previously described, at the output of amplifier 22 and is applied to inputs of gates N1, N4, N9, N12, N16 and N17. Similarly, a signal representing condition $T_D$ appears at the output of amplifier 18 and is applied to inputs of gates N4, N10, N12 and N17.

Signals representing conditions F, $\overline{F}$, R and $\overline{R}$ appear at the outputs of emitter follower 31, gate N3, emitter follower 32 and gate N8 respectively, being derived in the manner described below. Similarly, a signal representing the conditions $S_D$ and $\overline{S}_D$ appear at the outputs of emitter follower 33 and gate N10. The F condition signal is applied to inputs of gates N2, N3, N7, N5, N13 and N18, the $\overline{F}$ condition signal to an input of gate N1, the R condition signal to inputs of gates N2, N7, N8, N9, N13 and N18, the $\overline{R}$ condition signal to an input of gate N4, the $S_D$ condition signal to inputs of gates N2, N7, N10 and N18, and the $\overline{S}_D$ condition signal to an input of gates N9 and N14.

Gate 12*a* is controlled by the $\overline{F}$ condition signal, and is open for a positive gating signal which occurs when the tape is moving forwards to effect reproduction from channel A. Gates 12*b* and 12*d* are controlled by the outputs of gates N11 and N15 respectively. These are normally negative, holding gates 12*b* and 12*d* closed. The output of gate N11 as will be described, rises to the positive voltage when the tape is travelling in reverse after the "No" button has been pressed following a stop in response to a control record $T_c$ or $T_D$. This allows reproduction from channel B when required. The output of gate N15 rises to the positive voltage only when the "Yes" button is pressed following a stop in response to a control record $T_D$, allowing speech reproduction from channel D. Gate 15 is controlled by the output of gate N19 and is opened by the positive voltage which appears only when a control record $T_c$ has been reproduced and is followed by operation of the "No" button. Gate 15 thus opens at the times when it is required to reproduce a control record $T_D$ should one be present.

A signal representing the condition $\overline{P}$ is derived at the output of differentiating circuit 39 by means of a monostable circuit 30 feeding a differentiating circuit 39 in response to the application of a P condition signal to said monostable circuit 30 from the connection to contact 28. Monostable circuit 30 is of conventional form and responds to the negative impulse produced on that connection when the "Repeat" button 28 is operated to produce a negative impulse of predetermined duration, for example 4 seconds. The differentiating circuit 39 is also of conventional form. In the absence of any output from monostable circuit 30, circuit 39 produces a negative voltage output and responds to the trailing edge of an output pulse from the circuit 30 to produce a short positive going output pulse at that time. The $\overline{P}$ condition signal is thus not strictly the converse of the P condition signal since the impulse corresponding to operation of the "Repeat" button is delayed. The $\overline{P}$ condition signal is employed to start the reverse tape motion required, and the delay is introduced to allow any forward drive time to stop in response to the P condition signal, before the reverse drive starts.

Monostable circuit 29 is also of conventional form and has two parallel inputs to which the $\overline{F}$ and $\overline{R}$ condition signals are applied. It responds to a positive going change in either of said signals to produce a negative going pulse of say 4 seconds duration which is applied to the gating signal input of gate circuit 21 to close it for this period whenever the tape drive starts. The gate circuit 21 is otherwise always open and is closed for these periods to prevent the drive being stopped again, when starting up, by the control record $T_c$ which last stopped it.

The tape drive control circuit 25 has two inputs to which the $\overline{F}$ and $\overline{R}$ condition signals are applied from the outputs of gates N3 and N8. When the negative voltage is applied to both inputs the drive is stopped, but the appearance of the positive voltage at either input (they cannot appear simultaneously) results in a drive in the appropriate direction. The circuit 25 will, in known manner, include switching circuits arranged to respond to these input changes to initiate forward or reverse drive as required.

The operation of the NOR-gate circuits N1–19 will now be described in more detail. Each NOR-gate circuit has two or more inputs and produces the negative voltage at its output provided all the inputs are at the positive voltage. Otherwise, if any one or more of its inputs are at the negative voltage, the NOR-gate circuit output is the positive voltage. The emitter follower circuits 31–33 associated with circuits N1, N4 and N9 merely act in known manner as buffer stages producing the positive voltage or the negative voltage at their outputs in response to whichever voltage is applied to their inputs. Transistor circuits are employed in this example since the gates N1–19 are transistor circuits, but it will be understood that equivalent buffer stages may be employed in their place if the requirement arises.

Gate circuits N1–3 control the forward tape drive, gate N3 having two inputs which are coupled to the outputs of gates N1 (via follower 31) and N2. When the drive is stopped and no button is operated, both inputs to gate N3 are positive. Operation of the "Yes" button (contact 26) will change the $\overline{Y}$ line from negative to positive; and will accordingly produce a change in the output of gate N2 by making all four gating inputs positive, provided the signals representing conditions F, R and $S_D$ (applied to the other three gate inputs) are positive, i.e. provided the tape is not already being driven in either direction and was not last stopped by a control record $T_D$. When this change in the output of gate N2 occurs, the output of gate N3 changes to positive, allowing the tape drive control to start forward drive; and the positive output of gate N3 also operates to open gate 12*a*. At the same time, the $\overline{F}$ condition signal input to gate N1 changes to positive, changing the output of gate N1 to negative and with it the other input to gate N3. Thus, when the "Yes" button is released, the new conditions of gates N1 and N3 will be maintained. The forward drive can now only be stopped by changing the output of gate N1 back to positive, and this can be effected by changing one of the other two gate N1 input voltages to negative. These other two inputs represent the $T_c$ and P conditions, and will change either if a control record $T_c$ is reproduced from channel C (this will occur when a stop is required, as the $T_c$ signals are parallel to the ends of the primary records $A_1$–$A_p$ in channel A), or if the repeat button is pressed. When either of these contingencies arises, the gate circuits N1 and N3 return to their original conditions, with a negative output from gate N3.

In Boolean algebra, the equation for forward drive is:

$$F=F.\overline{T}_c.\overline{P}+\overline{F}.\overline{R}.\overline{S}_D.Y \qquad (1)$$

Considering the commencement of operation therefore with the tape loaded in the reproducing device, operation of the "Yes" button will as described above, initiate forward drive. The forward drive will continue until the $T_c$ condition signal becomes negative on reproduction of the control record $T_c$ parallel to the beginning of primary record $A_1$, whereupon the device will stop. Subsequent operation of the "Yes" button will again initiate forward drive, and record $A_1$ will be reproduced since gate 12*a* is open as long as the output of gate N3 is positive. The control record $T_c$ parallel to the end of record $A_1$ will cause the forward drive to stop again. By analogy, it will be seen that repeated operations of the "yes" button will then give reproduction of the primary records $A_2$ . . . $A_p$ in sequence, with a stop occurring at the end of each. As previously described, monostable circuit 29 closes gate 21 for a short period after the commencement of forward drive to ensure that the record $T_c$ which previously stopped the drive is not effective to prevent the drive from commencing again.

Reverse drive is controlled by the $\overline{R}$ output of gate N8, which gate has four inputs all normally held positive. Gate N4, which is coupled to one input of gate N8 through emitter follower circuit 32, operates in conjunction with gate N8 in the same manner as gates N1 and N3 operate for the forward drive. Reverse drive is initiated by one of the other three inputs of gate N8 going negative, whereupon the output of gate N8 goes positive, causing the reverse drive to commence. At the same time, the positive output from gate N8 is coupled to an input of gate N4 to give a negative output from said gate N4 which serves to hold gate N8 with a positive output despite the fact that the original condition causing it to change has ceased. Reverse drive can then be terminated by making one of the other two inputs of gate N4 go negative. These other two inputs are (as illustrated in FIGURE 2B) derived from the $T_c$ and $T_D$ condition signal lines which result in the reverse drive being stopped as required if a control record $T_c$ or $T_D$ is reproduced. This, with the appropriate operation of gates 15 and 21 as described below, ensures the reverse drive being stopped either at the end of a secondary record of the first kind in channel B, or when the next control record $T_c$ in channel C is reproduced after the end of a secondary record of the second kind in either channel B or channel D.

Commencement of reverse drive can be brought about in only one of three ways:

(i) By operation of the "Repeat" button, (ii) By operation of the "No" button, and (iii) By operation of the "Yes" button after the machine has been stopped by reproduction of a control record $T_D$.

The first of these is brought about under the control of gates N5–N7, which operates so that the repeat button is only effective if the drive is stopped at the end of a primary record or is in the course of reproducing a primary record i.e. in forward drive. Gate N6 normally has one input held negative by the $\overline{P}$ condition signal from differentiating circuit 39. Assuming the other input to gate N6 remains positive, gate N6 can only produce a negative output when the output of differentiating circuit 39 goes positive to produce, as previously described, a short positive pulse; and this operation occurs a short period, as determined by monostable circuit 30, after the "Repeat" button is pushed. Reverse drive will then commence since the negative output of gate N6 will change the output of gate N8 to positive and so on. Gates N5 and N7 ensure that the "Repeat" button can only be effective under the conditions specified, holding the second input of gate N6 positive if they are satisfied, but changing it to negative if they are not, thus then holding the output of gate N6 positive.

Gate N5 has two inputs, one of which is the normally negative output of gate N7, and the other of which is taken from the F condition signal line which is positive if there is no forward drive. The F condition signal line goes negative if there is a forward drive, i.e. if a primary record is being reproduced, thus holding the output of gate N5 positive under this condition. Gate N7 produces a negative output to hold the output of gate N5 positive if all three inputs of gate N7 are positive. These three inputs to gate N7 are the F, R and $S_D$ condition signals, and all three signals will be positive if the tape is stopped and the stop was not due to reproduction of a control record $T_D$. If the last is the case, it must have been stopped by a record $T_c$ and is therefore stopped at the end of a primary record.

The second way of initiating reverse drive, by operation of the "No" button, is controlled by gate N13. This gate has three inputs, one of which (connected to contact 27) is normally negative, the other two of which inputs receive the F and R condition signals and are accordingly both positive only if the tape is stopped. Closure of contact 27 by operation of the "No" button when the tape drive is stopped will thus make all three inputs to gate N13 positive, and this will change the output of gate N13 to negative thereby causing initiation of reverse drive by changing the output of gate N8.

The third way of initiating reverse drive, by operation of the "Yes" button after the tape has been stopped by a control record $T_D$, is controlled by gate N14. Gate N14 has two inputs, both normally negative, one connected to the "Yes" button contact 26 and the other connected to receive the $\overline{S}_D$ condition signal from the output of gate N10. The output of gate N14 will become negative, thus initiating reverse drive, only if the "Yes" button is operated when the $\overline{S}_D$ condition signal is positive i.e. when the tape has just been stopped by reproduction of a control record $T_D$.

The Boolean equation representing the condition for reverse drive is:

$$R=R.\overline{T}_c.\overline{T}_D+(\overline{F}.\overline{R}.\overline{S}_D+F).P+\overline{F}.\overline{R}.+S_D.Y \quad (2)$$

The generation of the signals representing the $S_D$ and $\overline{S}_D$ conditions is carried out by gates N9 and N10, with emitter follower circuit 33 coupling the normally positive output of gate N9 to one input of gate N10. Gate N10 has one other input to which the $T_D$ condition signal from amplifier 18 is applied. When a control record $T_D$ is reproduced causing this other input to gate N10 goes negative, the output of gate N10 becomes positive. This gate N10 output is applied back to one of the three inputs of gate N9, the other two inputs of which receive the $T_c$ and R condition signals. Provided these are both positive (which they will be, since a control record $T_c$ does not occur parallel to a control record $T_D$, and since the R condition signal will become positive as soon as the reproduction of the same control record $T_D$ stops the reverse drive through gates N4 and N8), the output of gate N9 changes to negative ensuring that the output of gate N10 remains positive. Change back to the normal condition can only occur on commencement of reverse drive, or upon the reproduction of a control record $T_c$, at which times the R or $T_c$ condition signal will go negative causing the outputs of gates N9 and N10 to change back to normal.

The Boolean equation representing the condition $S_D$ is given by:

$$S_D=S_D.\overline{R}.\overline{T}_c+T_D \quad (3)$$

Gate 12*b* in the signal channel from head 10*b* requires to be opened only on pressing the "No" button when the tape is still, having been stopped either by a control record $T_c$ or $T_D$. It should close again on receipt of either kind of control record. This permits reproduction of both kinds of secondary record on channel B whilst the tape is being driven in reverse following operation of the "No" button. This is effected by gates N11 and N12 in conjunction with gate N13 previously described. The output of gate N11 is normally negative, maintaining gate 12*b* closed. This condition can be changed only by a change of the output of gate N13 which, as previously described, occurs when the "No" button is pressed with the tape still. Change of the output of gate N11 makes all three inputs to gate N12 positive, changing its input to negative and thus maintaining the new condition of gate N11 after the "No" button is released. Reproduction subsequently of either a record $T_c$ or $T_D$ will change one input of gate N12, restoring the original condition with gate N11 output negative and gate 12*b* closed.

Gates N15 and N16, together with gate N14 previously described, similarly control gate 12*d* so that it opens when the "Yes" button is operated after the tape has been stopped by a control record $T_D$. Gate N15 normally has a negative output which holds gate 12*d* closed. As previously described, the output of gate N14 becomes negative under the condition with which we are now concerned. This causes the output of gate N15 to change, this change then being perpetuated after release of the "Yes" button by the consequent change of the one normally negative input of gate N15 and its output. This state of affairs continues until reproduction of a control record $T_c$ which changes the other input of gate N16 to negative, restoring the normal conditions.

Finally, gates N17–19 control gate 15, so that signals received by head 10*d* only pass to amplifier 16 when the tape drive is in reverse following operation of the "No" button in response to a primary record. Gate N18 has four inputs, three of which are held normally positive by the F, R and $S_D$ condition signals, and the fourth of which is normally held negative by the connection to contact 27. On operation of the "No" button, this fourth input becomes positive and, assuming the tape was not stopped by reproduction of a control record $T_D$, the output of gate N18 is changed to negative. This changes the output of gate N19 from negative to positive, thereby to open gate 15. The change in condition of gate N19 is then locked in by the action of gate N17, the output of which changes to negative in response to the changed output of gate N19, and is finally removed on reproduction of either a control record $T_c$ or $T_D$ which causes gates N17 and N19 to change back to their normal conditions.

Various simple changes may be made in the apparatus described with reference to the drawings. For example, the direction in which the secondary records are recorded may be forwards, the secondary records associated with one primary record lying in that part of channels B and D which is parallel to the primary record, the arrangement otherwise being the same. In this case reverse drive would only be called for after reproduction of a secondary record of the second kind, when the tape would have to be driven in reverse until the second control record $T_c$ is reproduced, indicating that the tape has been driven backwards to the beginning of the primary record with which the particular secondary records are associated.

Similarly, it will be appreciated that the order in which the tracks are arranged on the tape may be varied if so desired. Another possible variation is that, when the tape has stopped consequent upon reproduction of a control record $T_D$, operation of the "Yes" button results in reproduction of a secondary record of the second kind in channel B whilst the "No" button results in reproduction from channel D, the positions of the secondary records of the second kind having been transposed as compared with the arrangement shown in FIGURE 1.

These modifications and others will obviously require modification of the control circuits, but these will not be described here in detail.

Other modifications may be made, if required, in the design of the reproducing device, even if no modification is made in the arrangement of the records. For example, a single head might be employed instead of the four heads 10*a–d*, this one head being shifted from channel to channel as required. Again, the carrier for the records need not necessarily be a tape although this is the most convenient form presently known to the applicants, nor need the channels necessarily be provided on a single tape or other form of carrier although this again is a considerable convenience.

In the example described, the control circuits use a combination of gate circuits to control the operation of the tape drive control 25 and the gates 12 that determine which head is coupled to the output device 14. This again is not essential, and equivalent arrangements could be used. For example the control circuits might include a multi-position switch which can be stepped, for example by an electromagnetic stepping mechanism, from one position to another. Each position of the switch would correspond to different operating condition of the reproducing device, e.g. forward drive and reproduction from channel A, reverse drive and reproduction from channel D and so on, and relay circuits would operate in conjunction with the switch, its stepping mechanism and the control buttons to bring about the required operation of the device.

Further, the form of the control records may be varied. Each may consist of a burst of noise signals, for example, instead of a tone sigal. Again, two separate control channels C and D need not be provided if the control records $T_c$ and $T_D$ have differing characteristics, for example different frequencies, in which event these control records can be recorded in the same channel provided some suitable discriminating arrangement, for example filters, is employed in the reproducing device to distinguish between them.

The modifications discussed above have been directed to apparatus employing four channels, and to the simple case in which no series of secondary records includes more than a simple secondary record of the first kind and two of the second kind. It will be appreciated that more complex series may be required in some cases, the first secondary record of the first kind giving rise to reproduction of one of the second kind if the "Yes" button is operated but one of the first kind if the "No" button is operated. This further secondary record of the first kind may be succeeded by two secondary records of the second kind, or one of the second kind and one the first and so on.

Where the series of secondary records include some which have a number of secondary records of the first kind, it will be convenient to arrange each such series in a similar manner in the channels provided. Thus, for example, suppose the maximum number of secondary records of the first kind in a series is four, there may be five further channels allocated to the secondary records. Then, in a given series, the first secondary record of the first kind would be recorded in the first of these followed by one of the second kind. The second of the second would be recorded in the second further channel again followed by one of the second kind and so on until the fourth, where besides the secondary record of the second kind in the fourth channel there would be one in fifth channel as well for reproduction on operation of the "No" button after the fourth one of the first kind. A series with fewer secondary records of the first kind would utilise the channels in the same order as far as required in each case.

Whilst it is convenient to record any records which are to be reproduced following a certain record in positions such that they commence parallel to the end of that certain record (this wording is to be interpreted in this specification to include records in the same channel spaced by a small gap and also the provision of an equivalent gap in different channels), this it not necessary provided the control circuits and possibly the control records also are modified so that the necessary movement of the record carrier is brought about automatically at the same time as the channel switching.

What I claim is:

1. A sound reproduction apparatus comprising record means including a first record channel having a series of discrete primary records recorded therein, said record means also including a second record channel having recorded therein discrete secondary records that are associated with at least some of said primary records; reproduction means operable to reproduce records selectively from said first and second channels, manually operable means actuable selectively to either of first and second conditions, and control means for controlling operation of said reproduction means in accordance with actuation of said manually operable means, said control means including means responsive to actuation of said manually operable means to said first condition after reproduction of a primary record to render said reproduction means operative to reproduce the next primary record of said series, said control means also including means responsive to actuation of said manually operable means to said second condition after reproduction of a primary record to render said reproduction means operative to reproduce from said second channel any said secondary record associated with the primary record last reproduced.

2. The apparatus of claim 1 wherein said first and second record channels are record channels of a single magnetic record tape.

3. The apparatus of claim 1 wherein said manually operable means comprises two push-buttons, said control means being differently responsive to actuation of different ones of said push-buttons.

4. A sound reproduction apparatus comprising a first record channel having a series of discrete primary sound records recorded therein; a second record channel having recorded therein discrete secondary sound records that are associated with at least some of said primary records, reproduction means operable to reproduce records selectively from said first and second channels, manually operable means actuable selectively to either of two different conditions; and control means for controlling operation of said reproduction means in accordance with the actuation of said manually operable means, said control means including means for automatically stopping said reproduction means at the end of the reproduction of any said primary record, said control means also including means operable when said reproduction means is stopped at the end of a primary record and responsive to actuation of said manually operable means to one of said conditions for rendering said reproduction means operative to reproduce the next primary record of said series, said control means further including means operable when said reproduction means is stopped at the end of a primary record and responsive to actuation of said manually operable means to the other of said two different conditions to render said reproduction means operative to reproduce from said second record channel any said secondary record associated with the primary record last reproduced.

5. The apparatus of claim 4 wherein said first channel is a record channel of a magnetic record tape, said tape also having marker records recorded therein at positions marking the end of each primary record, said means for automatically stopping said reproduction means at the end of each primary record comprising means responsive to said marker records.

6. A control apparatus comprising record means including a first record channel having a series of discrete primary sound records recorded therein, said record means including second and third record channels having recorded therein a plurality of groups of discrete secondary sound records, different ones of said groups being associated with different ones of said primary records, each said group comprising one secondary record of a first kind recorded in said second channel and two secondary records of a second kind recorded in the second and third channels respectively, reproduction means operable to reproduce records selectively from said first, second and third channels, manually operable means actuable selectively to either of first and second conditions, and control means for controlling the operation of said reproduction means in accordance with actuation of said manually operable means, said control means including means responsive to actuation of said manually operable means to said first condition after reproduction of a primary record to render said reproduction means operative to reproduce as a discrete step the next primary record of said series, said control means also including means responsive to actuation of said manually operable means to said second condition after reproduction of a primary record to render said reproduction means operative to reproduce the said secondary record of said first kind of any said group associated with the primary record last reproduced, said control means further including means responsive to actuation of said manually operable means to said first condition after reproduction of a secondary record of said first kind in any said group to render said reproduction means operative to reproduce the secondary record of the second kind recorded in said second channel of the same said group, and means in said control means responsive to actuation of said manually operable means to said second condition after reproduction of a secondary record of said first kind in any said group for rendering said reproduction means operative to reproduce the secondary record of the second kind recorded in said third channel of the same said group.

7. An aid to performance of a predetermined routine, comprising a plural-channel recording tape having instruction recordings in the plural channels thereof relating to successive sub-routines of said predetermined routine, at least some of said sub-routines comprising a primary instruction and at least one secondary instruction, manually operable means adapted to be selectively actuated to signify the results achieved after performance of said primary and secondary instructions, and means for reproducing recorded instructions from said tape in a sequence at least partially determined by the actuation of said manually operable means, said reproducing means including means for stopping reproduction from said tape at the end of each reproduced instruction, means responsive to actuation of said manually operable means in a manner signifying a first result after reproduction of the primary instruction of any sub-routine for reproducing the primary instruction of the next sub-routine, and means responsive to actuation of said manually operable means in a manner signifying a second result after reproduction of the primary instruction of any sub-routine for reproducing the said secondary instruction of that sub-routine.

8. The structure of claim 7 wherein said manually operable means comprises two push-buttons operable one at a time to signify said first and second results respectively.

9. The structure of claim 7 wherein one record channel of said tape contains each said primary instruction, said secondary instructions being recorded in at least one other record channel of said tape.

10. An aid to performance of a predetermined routine, comprising a plural-channel recording tape carrying along successive sections of its length recordings of successive sub-routines of said predetermined routine, said sub-routines comprising a primary instruction recorded on said tape in a forward direction and at least one secondary instruction recorded on said tape in a reverse direction, manually operable means arranged to be selectively actuated to signify different answers to said instructions, and means for reproducing recorded instructions from the successive sections of said tape in turn and in accordance with actuation of said manually operable means, said reproducing means including tape-drive means settable selectively to any one of three conditions, namely a first condition in which said tape is held stationary, a second condition in which said tape is driven in a forward direction, and a third condition in which said tape is driven in a reverse direction, means responsive to a first actuation state of said manually operable means when said tape-drive means is in said first condition for setting said tape-drive means to said second condition, means responsive to a second actuation state of said manually operable means when said tape-drive means is in said first condition for setting said tape-drive means to said third condition, and means for resetting said tape-drive means to said first condition at the end of reproduction of any said instruction.

11. An aid to performance of a predetermined routine, comprising a plural-channel magnetic recording tape that carries along successive sections of its length recordings of successive sub-routines of said predetermined routine, each sub-routine comprising a primary instruction, a secondary instruction of a first kind, and first and second secondary instructions of a second kind, two manually actuable devices for actuation selectively and one at a time to signify answers to said instructions, and means for reproducing recorded instructions from the successive sections of said tape in turn and in accordance with actuation of said manually actuable devices, said reproducing means including means for stopping reproduction from said tape at the end of each reproduced instruction, means responsive to actuation of a first of said devices at the end of reproduction of the primary instruction of any sub-routine to reproduce the primary instruction of the next sub-routine, means responsive to actuation of the second of said devices at the end of reproduction of the primary instruction of any sub-routine to reproduce the said secondary instruction of that same sub-routine, means responsive to actuation of said first device at the end of reproduction of the secondary instruction of the first kind from any said sub-routine to reproduce said first secondary instruction of said second kind of that same sub-routine, and means responsive to actuation of said second device at the end of reproduction of the secondary instruction of the first kind from any said sub-routine to reproduce said second secondary instruction of said second kind from the same sub-routine.

12. An aid to performance of a predetermined routine, comprising a plural-channel magnetic recording tape that carries along successive sections of its length recordings of successive sub-routines of said predetermined routine, each sub-routine comprising a primary instruction recorded on the tape in a first channel thereof and at least one secondary instruction recorded on the tape in a second channel thereof, manually actuable means for actuation selectively to either of first and second conditions for signifying answers to said instructions, and means for reproducing recorded instructions from the successive sections of said tape in turn and in accordance with actuation of said manually actuable means, said reproducing means comprising first and second magnetic sensing heads for providing electric signals in accordance with records sensed from said first and second channels respectively, output means for reproducing sound records sensed by said first and second heads, first and second gates for gating to said output means signals provided by said first and second heads respectively, tape-drive means switchable from a hold state in which said tape is held stationary to a drive-state in which said tape is driven past said heads, control means responsive to actuation of said manually actuable means when said tape-drive means is in said hold state for setting said tape-drive means to said drive state, said control means including means responsive to actuation of said manually actuable means to said first condition to supply a gating signal to said first gate, said control means also including means responsive to actuation of said manually actuatable means to said second condition to supply a gating signal to said second gate, and means for resetting said tape-drive means to said hold state after reproduction of any said instruction.

13. An aid to performance of a predetermined routine, comprising a plural-channel magnetic recording tape that carries along successive sections of its length recordings of successive sub-routines of said predetermined routine, each sub-routine comprising a primary instruction recorded on the tape in a first channel, at least one secondary instruction recorded on the tape in a second channel, and marker signals recorded in a third channel at positions on the tape where the respective primary instructions end, manually actuable means for actuation selectively to either of first and second conditions for signifying answers to said instructions, and means for reproducing recorded instructions from the successive sections of the tape in turn and in accordance with actuation of said manually actuable devices, said reproducing means comprising first, second and third magnetic sensing heads for providing electric signals in accordance with records sensed from the first, second and third channels respectively, an electro-acoustic transducer for audibly reproducing instruction records sensed by the first and second heads, first and second gates for gating to the transducer the signals provided by the first and second heads respectively, tape drive means switchable from a hold state in which the tape is held stationary to a drive state in which the tape is driven past the sensing heads, means responsive to actuation of said manually actuable means when the tape drive means is in said hold state for switching said tape drive means to said drive state, means responsive to actuation of said manually actuable means to said first condition to supply a gating signal to the first gate, means responsive to actuation of said manually actuable means to said second condition to supply a gating signal to the second gate, and means for resetting said tape drive means to said hold state in response to any marker signal sensed by said third head.

14. A magnetic record reproducer for reproducing records recorded in three channels of a magnetic tape, comprising first, second and third magnetic sensing heads for providing electric signals in accordance with records sensed from the first, second and third channels respectively, transducer means for audibly reproducing records sensed by said first and second heads, first and second gates for gating the signals provided by said first and second heads respectively to said transducer means, tape drive means switchable from a hold state in which the tape is held stationary to a drive state in which the tape is driven past all three sensing heads, manually actuable means for actuation selectively to either of first and second conditions, means responsive to actuation of said manually actuable means when the tape drive means is in said hold state for switching said tape drive means to said drive state, means responsive to actuation of said manually actuable means to said first condition for opening said first gate, means responsive to actuation of said manually actuable means to said second condition for opening said second gate, and means responsive to a predetermined signal supplied by said third head for resetting said tape drive means to said hold state.

15. An instruction apparatus comprising a multichannel record tape having a plurality of discrete primary instruction records recorded in at least a first one of said channels, said record tape also having a plurality of discrete secondary instruction records recorded in at least a second one of said channels, reproduction means operable to reproduce said primary and secondary records, means for halting operation of said reproduction means after reproduction of any of said primary and secondary records, and operator controlled means actuable to different conditions for at least partially determining the sequence in which said primary and secondary instruction records are reproduced, said operator controlled means including means responsive to actuation thereof to one of said conditions when said reproduction means is halted for causing said halted reproduction means to reproduce one of said primary instruction records from said first channel, said operator controlled means also including means responsive to actuation thereof to a different one of said conditions when said reproduction means is halted for causing said halted reproduction means to reproduce one of said secondary instruction records from said second channel.

References Cited by the Examiner

UNITED STATES PATENTS 2,558,853 7/51 Kappeler ............ 179—100.2

IRVING L. SRAGOW, *Primary Examiner.*

BERNARD KONICK, *Examiner.*